US008483630B2

(12) United States Patent
Cathelin et al.

(10) Patent No.: US 8,483,630 B2
(45) Date of Patent: Jul. 9, 2013

(54) METHOD AND SYSTEM FOR GENERATING A PULSE SIGNAL OF THE ULTRA WIDE BAND TYPE

(75) Inventors: Andrea Cathelin, Laval (FR); Stéphane Thuries, Castanet-Tolosan (FR); Sylvain Godet, Saint-Cézert (FR); Eric Tournier, Toulouse (FR); Jacques Graffeuil, Ramonville Saint Agne (FR)

(73) Assignees: STMicroelectronics SA, Montrouge (FR); Centre National de la Recherche Scientifique (CNRS), Paris (FR)

( * ) Notice: Subject to any disclaimer, the term of this patent is extended or adjusted under 35 U.S.C. 154(b) by 86 days.

(21) Appl. No.: 13/122,889

(22) PCT Filed: Oct. 6, 2009

(86) PCT No.: PCT/EP2009/062962
§ 371 (c)(1),
(2), (4) Date: Jul. 5, 2011

(87) PCT Pub. No.: WO2010/040740
PCT Pub. Date: Apr. 15, 2010

(65) Prior Publication Data
US 2011/0260757 A1    Oct. 27, 2011

(30) Foreign Application Priority Data
Oct. 7, 2008    (FR) .................................... 08 56778

(51) Int. Cl.
*H03C 1/52*    (2006.01)
(52) U.S. Cl.
USPC ............. 455/108; 455/93; 455/102; 455/110; 455/127.1

(58) Field of Classification Search
USPC ............................ 455/108, 93, 102, 110, 127
See application file for complete search history.

(56) References Cited

U.S. PATENT DOCUMENTS

| | | | | | |
|---|---|---|---|---|---|
| 4,422,362 | A | * | 12/1983 | Chibana | 84/624 |
| 5,220,275 | A | * | 6/1993 | Holmqvist | 324/76.82 |
| 6,489,911 | B1 | * | 12/2002 | O'Dwyer | 341/144 |
| 6,657,573 | B2 | * | 12/2003 | Langlois et al. | 341/147 |
| 6,993,087 | B2 | * | 1/2006 | Rosnell et al. | 375/295 |
| 7,504,976 | B1 | * | 3/2009 | Pellon | 341/143 |

OTHER PUBLICATIONS

Nilsson et al., "A Low Complexity DDS IC for FM-UWB Applications," Jul. 1, 2007, pp. 1-5.

(Continued)

*Primary Examiner* — Sanh Phu
(74) *Attorney, Agent, or Firm* — Allen, Dyer, Doppelt, Milbrath & Gilchrist, P.A.

(57) ABSTRACT

System for generating a pulsed signal of the ultra wideband type, comprising a device for direct digital frequency synthesis (DDS) comprising a phase accumulator (ACCP) able to deliver at a first frequency (Fclk) phases coded on i bits and spaced apart by a phase increment ($\Delta p$) differing by a power of two and situated in the vicinity of $2^{i-1}$, processing means (MT) able to receive said phases and arranged so as to deliver an amplitude-modulated output signal (SG) whose envelope exhibits a succession of regions respectively delimited by zones of zero amplitude (ZA, ZB), each amplitude-modulated signal part situated in one of said regions forming a pulse of the ultra wideband type (IMP) whose central frequency is equal to said first frequency and whose width depends on the value of the phase increment, and control means (MC) able to regulate the operation of the digital synthesis device so as to selectively deliver one or more pulses of the ultra wideband type.

24 Claims, 7 Drawing Sheets

OTHER PUBLICATIONS

Thuries et al., "A 6-GHz Low-Power BiCMOS SiGe:C 0.25 μm Direct Digital Synthesizer," IEEE Microwave and Wireless Components Letters, vol. 18, No. 1. Jan. 1, 2008, pp. 46-48.

Thuries et al., "A DDS-Oriented Phase-to-Amplitude Converter Using a SiGe:C Bipolar Transistors Differential Pair," IEEE International Workshop on Radio-Frequency Integration Technology, Nov. 30-Dec. 2, 2005, Singapore, pp. 211-214.

Naviner, "Architectures radiofréquences pour l'émission da signaux impulsionnels à ultra large bande," Apr. 2007, pp. 1-89.

* cited by examiner

METHOD AND SYSTEM FOR GENERATING A PULSE SIGNAL OF THE ULTRA WIDE BAND TYPE

The invention relates to signals of the Ultra Wide Band type, or UWB signals, and, more particularly, to pulse signals of the ultra wide band type.

A conventional scheme for generating UWB pulses uses direct generation on the basis of fast phenomena such as for example the crossover from a forward bias to a reverse bias of an SRD diode ("Step Recovery Diode"), according to an acronym well known to the person skilled in the art.

Another conventional solution uses the indirect generation of pulses using, for example, modulation of a carrier by a Gaussian function in a mixing stage.

According to one mode of implementation and embodiment, a method and system which are totally different from the conventional prior art solutions are proposed for generating UWB pulses.

According to another mode of implementation and embodiment, a method and a system for generating UWB pulses are proposed which allows a controlled adjustment of the bandwidth and/or of the central frequency of the UWB pulses.

In particular, a direct digital synthesis of pulses of ultra wide band type (UWB pulses) is thus proposed. More particularly, the phase accumulator of a direct digital frequency synthesis device with a phase increment having a chosen value is controlled so as to generate an output signal of the digital frequency synthesis device exhibiting an amplitude modulation whose envelope exhibits zero crossings. The digital frequency synthesis device is moreover advantageously devised in such a way that the generated-signal part situated between two zero crossings of the envelope forms a pulse of the ultra wide band type (UWB pulse).

The digital frequency synthesis device thus devised is then controlled for example so as to isolate one or more pulses of UWB type.

A pulse is said to be of the ultra wide band type when, from the frequency point of view, it exhibits characteristics approaching those, generally accepted in this field, of an ultra wide band (UWB) pulse and when from the temporal point of view, its form approaches or is equal to that of an ideal UWB pulse.

According to a first aspect, there is proposed a system for generating a pulse signal of the ultra wide band type comprising:
a digital frequency synthesis device, and
control means able to control the operation of the digital frequency synthesis device.

The digital frequency synthesis device comprises a phase accumulator able to deliver, at a first frequency, phases coded on i bits mutually spaced apart by a phase increment that is different from a power of two, greater than $2^i/3$ and less than $2^i/3+2^i/2$.

The digital frequency synthesis device moreover comprises processing means able to receive the said phases and designed to deliver an amplitude-modulated output signal whose envelope exhibits a succession of regions respectively delimited by zones of zero amplitude. Each amplitude-modulated signal part situated in one of the said regions forms a pulse of the ultra wide band type whose central frequency is equal to the said first frequency and whose width depends on the value of the phase increment.

The control means are able to control the operation of the digital frequency synthesis device so as selectively to deliver one or more pulses of the ultra wide band type.

The inventors have in effect observed that the output signal generated by the digital frequency synthesis device was amplitude modulated as soon as the phase increment was different from a power of two. Furthermore, the fact that this phase increment is moreover greater than $2^i/3$, that is to say in fact than a third of the maximum number of possible phases that can be delivered by the phase accumulator, and less than $2^i/3+2^i/2$ made it possible to have an envelope of this amplitude modulation which exhibits zero crossings with moreover a signal portion between the zero crossings which is exploitable, that is to say with a relatively significant number of values.

In combination with this characteristic of the envelope of the amplitude modulation, the processing means of the digital frequency synthesis device have been devised in such a way that, between two zero crossings of the envelope, the latter exhibits a form substantially approaching the envelope of a UWB pulse.

Several possibilities exist for devising such processing means.

Thus, according to a first variant, the processing means can comprise a phase/amplitude converter, for example a memory, coupled to the output of the phase accumulator, and containing digital samples of a waveform corresponding to the envelope of the pulse of the ultra wide band type. By way of indication, this waveform can be a portion of a sinusoid or else a Gaussian.

According to another variant, the processing means can comprise conversion means for generating a triangular analogue signal in response to the output signal delivered by the phase accumulator, and a differential pair of transistors, for example bipolar transistors, coupled to the output of the conversion means and able to generate the said pulse or pulses of ultra wide band type. In such a variant, the fact of replacing the memory by a differential pair allows, not only a reduction in the consumption of the system and its integration area, but also leads to an exponential waveform which more closely approaches a Gaussian, and which makes it possible to obtain at output a pulse which more precisely and more exactly approaches an ideal UWB pulse.

The waveform to be generated comprising in general an axial symmetry, it is possible to choose the value of the phase increment in the span $]2^i/3;2^i/2[$ or else in the span $]2^i/2;2^i/2+2^i/3[$.

According to an embodiment, so as to selectively isolate one or more pulses of UWB type, the control means are able to activate the phase accumulator from a first phase value which corresponds to a value of the signal generated at the output of the digital frequency synthesis device and which is situated within or in the vicinity of a first zone of zero amplitude of the said modulation envelope, up to a second phase value which corresponds to a value of the signal generated at the output of the digital frequency synthesis device and which is situated within or in the vicinity of a second zone of zero amplitude of the said modulation envelope, the said first zone and the said second zone being consecutive.

According to an embodiment, the system furthermore comprises control means able to adjust the value of the said first frequency and/or that of the phase increment so as to adjust in a controlled manner the central frequency and/or the bandwidth of each pulse of ultra wide band type.

The system can advantageously be embodied in the form of an integrated circuit, for example in CMOS or BiCMOS technology.

According to another aspect, there is proposed a method for generating a pulse signal of the ultra wide band type, comprising at least one delivery at a first frequency, by a phase accumulator of a direct digital frequency synthesis device, of phases coded on i bits, on the basis of a phase increment that is different from a power of two, greater than $2^i/3$ and less than $2^i/3+2^i/2$, between a pair of phases corresponding respectively to two successive crossings of the envelope of the amplitude modulation of the signal generated at the output of the direct digital synthesis device within or in the vicinity of a zone of zero amplitude of the said envelope, the signal part generated between two successive zones of zero amplitude corresponding to a pulse of the ultra wide band type whose central frequency is equal to the said first frequency and whose width depends on the value of the phase increment.

According to a mode of implementation, the method comprises several deliveries of the said phases of the phase accumulator respectively performed sequentially on command between the said pair of phases so as sequentially to generate several pulses of ultra wide band type.

According to a variant, digital samples representative of a waveform having a form analogous to that of the said envelope of the amplitude modulation are stored in the direct digital frequency synthesis device.

According to another variant, the direct digital frequency synthesis device comprises a differential pair of transistors, and during each delivery of phases by the phase accumulator a triangular analogue signal is delivered to the said differential pair of transistors on the basis of the values of the phases delivered.

According to a mode of implementation, the method furthermore comprises a controlled adjustment of the value of the said first frequency and/or of that of the phase increment so as to adjust in a controlled manner the central frequency and/or the bandwidth of each pulse of ultra wide band type.

Other advantages and characteristics of the invention will appear on examining the detailed description of wholly non-limiting modes of implementation and embodiment, and appended drawings in which.

Figure 1:
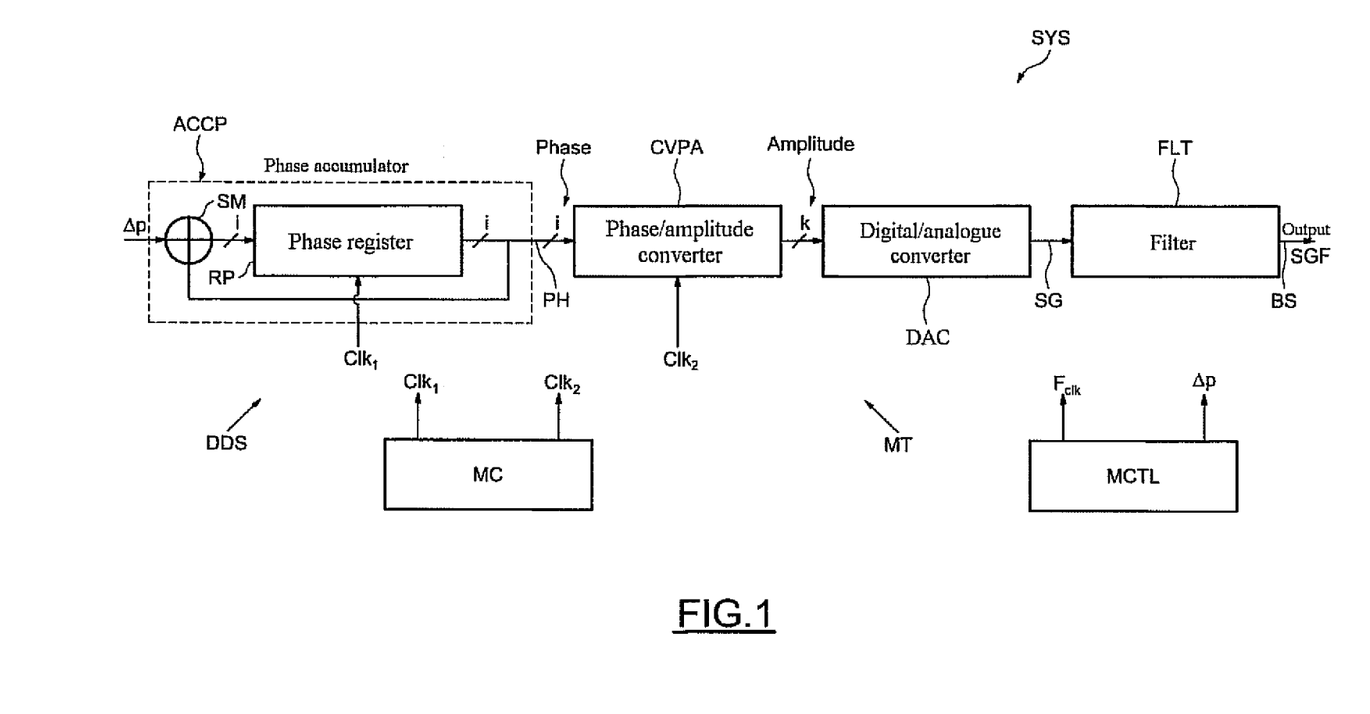
FIG. 1 illustrates an exemplary embodiment of a system for generating a pulse signal according to the invention.

Referring now more particularly to FIG. 1, the reference SYS designates in a general manner a system for generating a pulse signal of the ultra wide band type.

This system mainly comprises a direct digital frequency synthesis device DDS and control means MC able to control the operation of the digital synthesis device.

A direct digital frequency synthesis device DDS ("Direct Digital Synthesizer") is a device generally known by the person skilled in the art for directly generating a periodic signal, generally sinusoidal, for example on the basis of certain samples stored in a memory. The output signal is provided by a digital analogue converter and is optionally filtered. The digital information provided to the digital analogue converter represents the instantaneous amplitude of the signal. The successive samples of the signal may arise for example from a read-only memory. The address applied to the input of the read-only memory represents the signal phase. The latter is generated in general by a counter called a phase accumulator. The latter delivers the successive phases at the tempo of a first frequency and on the basis of a phase increment.

The phases are digital words which can be coded on i bits. The maximum possible number of phases of different values capable of being delivered by the phase accumulator is then equal to $2^i$.

As will be seen in greater detail hereinafter, the value of the phase increment will be chosen specifically, and the processing means MT of the DDS device, that is to say the means coupled at the output of the phase accumulator, will be designed to deliver an amplitude-modulated output signal whose envelope exhibits a succession of regions respectively delimited by zones of zero amplitude, each amplitude-modulated signal part situated in one of the said regions, forming a pulse of the ultra wide band type.

In the exemplary embodiment of FIG. 1, the phase accumulator ACCP comprises a summator SM receiving as input the phase increment $\Delta p$ and whose output is linked to the input of a register RP, called a phase register, whose output is looped back to another input of the summator SM. The output of the phase register also forms the output of the phase accumulator and consequently delivers digital words PH, or phases, here coded on i bits.

The phases PH are delivered at the frequency of a clock signal $Clk_1$, this frequency being designated hereinafter by "first frequency".

The processing means MT of the DDS device, coupled at the output of the phase accumulator ACCP, comprise in this example a phase-amplitude converter CVPA which gives the form of the signal.

The phase-amplitude converter can be a read-only memory, which contains the samples k of the waveform to be generated. These samples can be coded on n bits, n possibly being different from i.

The addresses of the memory forming the converter CVPA can also be coded on i bits. The delivery of the phases of the phase accumulator is then equivalent to a linear scan of the memory, which is faster or slower depending on the phase increment $\Delta p$.

As will be seen in greater detail hereinafter, the phase-amplitude converter is also controlled by another clock signal $Clk_2$. As will be seen in greater detail hereinafter this other clock signal may at a certain moment be identical in phase and in frequency to the clock signal $Clk_1$.

The samples, or amplitudes, k, delivered by the phase-amplitude converter are delivered to a digital analogue converter DAC which converts the digital signal into an analogue signal SG, the latter optionally being filtered in a filter FLT so as to deliver the output signal SGF to the output terminal BS of the system SYS. In the case where the filter FLT is not present, the output signal is then directly the signal SG.

A phenomenon of amplitude modulation of the signal SG, more or less pronounced, appears as soon as the increment $\Delta p$ is not a power of two. Moreover, if the integer increment $\Delta p$ lies in the vicinity of $2^{i-1}$, that is to say $2^i/2$, the envelope of the amplitude modulation exhibits zero crossings with signal portions between the zero crossings that can be exploited particularly well in terms of number of values. That said, the inventors have observed that an exploitable bracket of values for $\Delta p$ is for example the interval $]2^i/3; 2^i/2+2^i/3[$.

It is this amplitude modulation whose envelope exhibits successive zero crossings that will be exploited in combination with a particular waveform so as selectively to obtain one or more pulses of the ultra wide band type.

Although there is no universal definition of an ideal UWB pulse, it is generally accepted, as regards its spectrum, that a UWB pulse exhibits a bandwidth of greater than 500 MHz or is greater than 20% of its central frequency. These definitions relate only to the frequency aspect. As regards the temporal aspect, there is no particular definition, but it may be accepted that the general form of a UWB pulse is the product of an envelope and a sinusoidal carrier of frequency equal to the central frequency of the UWB pulse. As regards the envelope, a Gaussian envelope most closely approaches the envelope of an ideal UWB pulse.

Digital samples of a waveform corresponding to the envelope of the pulse of the ultra wide band type which will be generated as output from the system SYS will therefore be stored in the phase-amplitude converter.

This waveform can be a Gaussian. That said, it can also be a sinusoid or a sinusoid portion which also makes it possible to obtain a good approximation of the envelope of a UWB pulse.

When the waveform to be generated exhibits a symmetry, this generally being the case for the generation of pulses of the UWB type, it is not necessary to store the whole of the waveform in memory. It is then possible to choose the value of the phase increment in the span $]2^i/3;2^i/2[$ or else in the span $]2^i/2;2^i/2+2^i/3[$.

Figure 2:
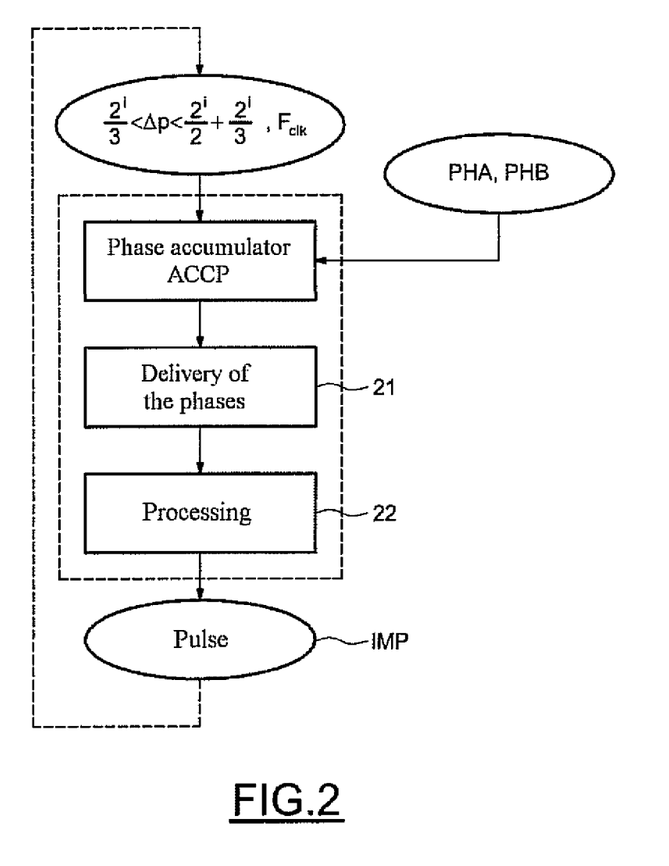
FIG. 2 schematically illustrates a mode of implementation of a method according to the invention.

As illustrated more particularly in FIG. 2, the phase accumulator ACCP delivers the successive phases mutually spaced apart by the increment $\Delta p$ at the first frequency $F_{clk}$ (step 21).

Figure 3:
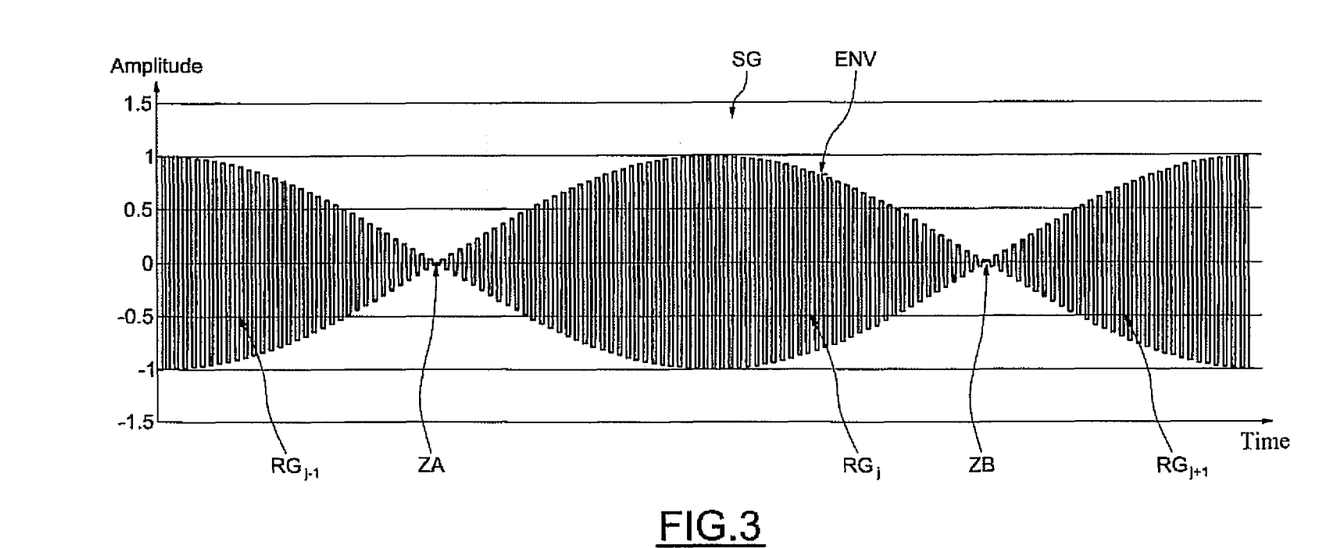
FIG. 3 schematically illustrates an example of an output signal generated by a system according to the invention.

After processing 22 performed in the processing means, and assuming that the phase accumulator operates in a continuous manner, the signal SG, an example of which is illustrated in FIG. 3, is obtained at the output of the digital/analogue converter DAC.

It is therefore seen that this signal SG is an amplitude-modulated signal whose envelope ENV exhibits a succession of regions $RG_{j-1}$, $RG_j$, $RG_{j+1}$ .... These regions are respectively delimited by zones of zero amplitude ZA, ZB.

Also, each amplitude-modulated signal part situated in one of the said regions, for example the region $RG_j$, forms a pulse of the ultra wide band type whose central frequency is equal to the said first frequency $F_{clk}$ and whose width depends on the value of the phase increment $\Delta p$.

In order to isolate a pulse of the UWB type, from among the pulse train capable of being generated by the system, the control means MC will activate the phase accumulator ACCP from a first phase value PHA (FIG. 2) which corresponds to a value of the signal SG generated at the output of the digital frequency synthesis device DDS, and which is situated within or in the vicinity of a first zone of zero amplitude ZA of the modulation envelope ENV, up to a second phase value PHB which corresponds to a value of the signal SG and which is situated within or in the vicinity of a second zone ZB of zero amplitude of the modulation envelope ENV. The first zone ZA and the second zone ZB are consecutive.

Thus, by operating the phase accumulator between the two values PHA and PHB, a pulse of UWB type is generated.

Also, by repeating this operation several times, it is possible to generate several UWB pulses, the duration separating two UWB pulses, that is to say the duration of quiescence of the phase accumulator ACCP, dependent on desired characteristics of the pulse signal of the ultra wide band type desired.

In fact, the inventors have observed that the frequency inscribed inside the envelope ENV is equal to the first frequency $F_{clk}$. It is therefore independent of $\Delta p$.

Moreover, if the architecture of the digital/analogue converter DAC is such that the latter behaves as a blocker of order zero, the signal inscribed in the envelope is a square signal, and is so whatever the waveform stored in the phase-amplitude converter. That said, other architectures are possible for the converter DAC leading to behaviours of blockers of order greater than zero.

Also, the phase increment $\Delta p$ controls only the period of the envelope ENV, that is to say the width of the UWB pulse.

Therefore, the output frequency of the signal SG is then fixed and equal to the first frequency $F_{clk}$. It is the central frequency of the UWB pulse.

Since the envelope ENV has the same form as the signal to be generated, a Gaussian pulse will be stored if one wishes to obtain a Gaussian envelope.

As indicated above, an ideal UWB pulse exhibits a Gaussian envelope and a sinusoidal carrier. Indeed, the spectrum of a Gaussian envelope is also a Gaussian while the fact of having a sinusoidal carrier makes it possible to transpose the spectrum of the envelope about a single frequency which is the central frequency of the UWB pulse.

If the envelope is not entirely Gaussian, but for example sinusoidal, the spectrum can also be considered to be broadband even if it is controlled a little less well than with a Gaussian.

If the carrier is not sinusoidal, but for example square, the spectrum is transposed about the fundamental (central frequency) and also about its harmonics. In this case, it will preferably be possible to minimize these harmonics, for example by using the filter FLT.

Figure 4:
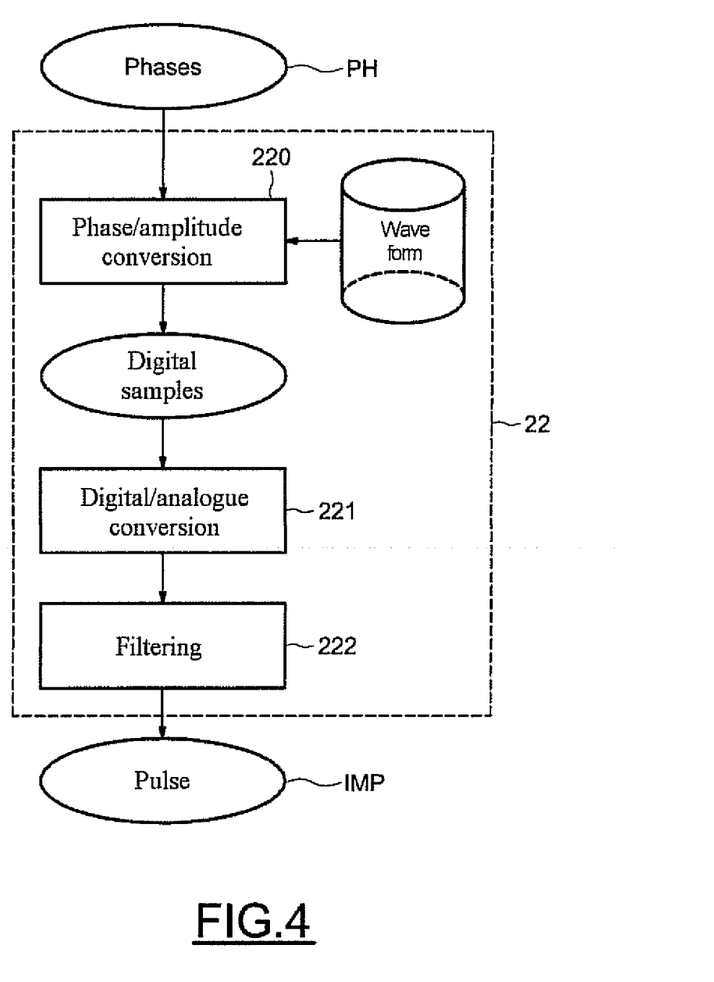
FIG. 4 illustrates a variant of implementation of a method according to the invention.

As has just been seen, and as recalled in FIG. 4, the processing 22 of the signal delivered by the phase accumulator comprises a phase/amplitude conversion 220 by using a stored appropriate waveform, so as to obtain digital samples of the waveform corresponding to the envelope of the pulse of the ultra wide band type.

Next, a digital/analogue conversion 221 is performed, optionally before a filtering 222.

Figures 5, 6, 8:
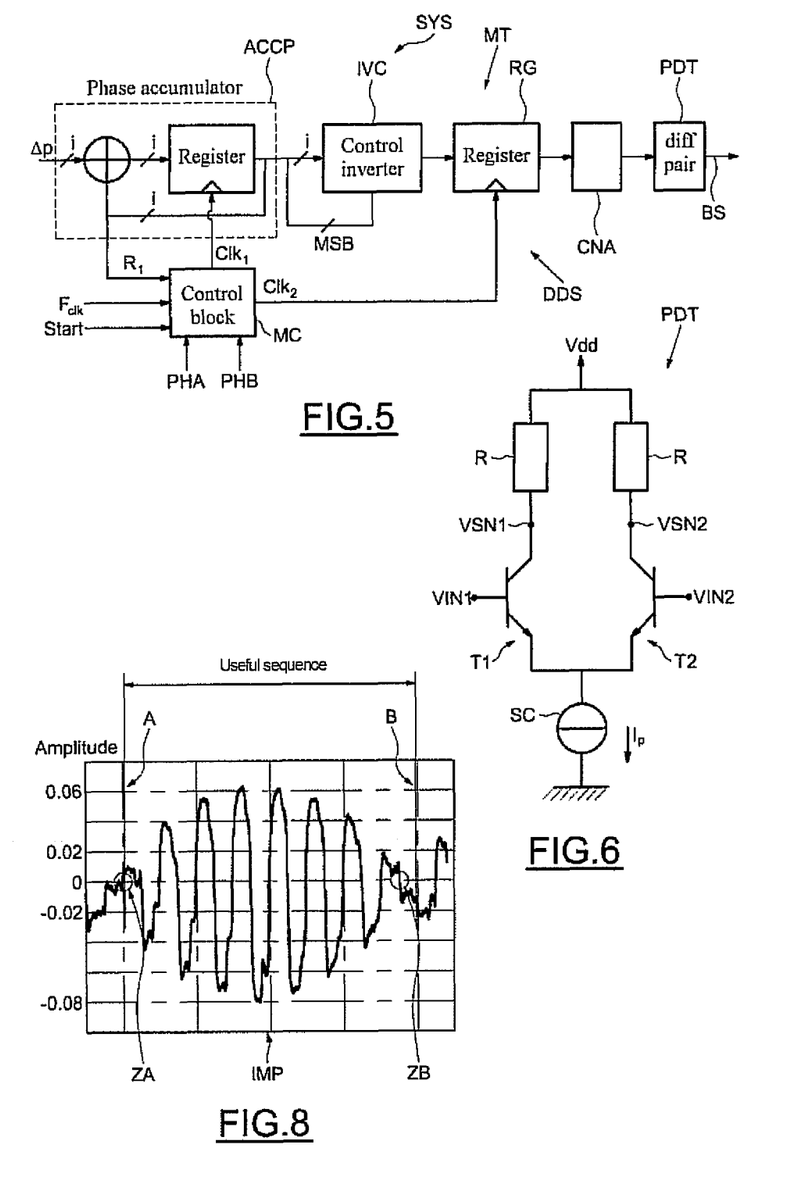
FIGS. 5 and 6 illustrate another exemplary embodiment of a system for generating a pulse signal of the UWB type according to the invention.
FIG. 8 illustrates an example of a pulse of UWB type generated by a system of the type of that illustrated in FIG. 5.
Figure 7:
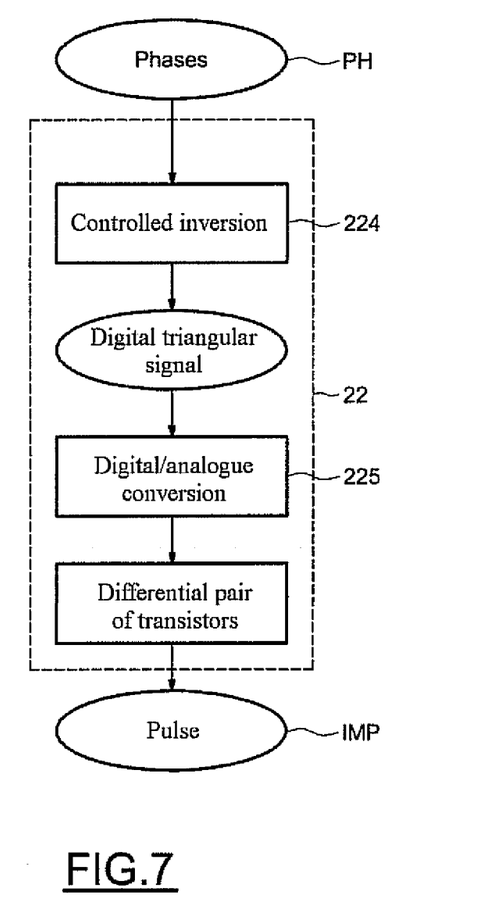
FIG. 7 illustrates another mode of implementation of a method according to the invention.

That said, another type of system architecture associated with another type of processing 22 is also possible, as illustrated for example in FIGS. 5 to 7.

With respect to the architecture presented in FIG. 1, the processing means of the DDS device whose architecture is illustrated in FIG. 5 do not comprise any phase/amplitude converter (ROM memory for example), but comprise conversion means, for generating a triangular analogue signal in response to the output signal delivered by the phase accumulator ACCP, and a differential pair of transistors PDT coupled to the output of the conversion means and able to generate the said pulse or pulses of ultra wide band type.

The conversion means here comprise a controlled inverter IVC coupled to the phase accumulator, and an analogue digital conversion stage DAC coupled to the output of the controlled inverter.

The inverter IVC is controlled by the high-order bit MSB of the phase i delivered by the phase accumulator ACCP.

A register RG, controlled by the clock signal $Clk_2$, is connected between the output of the controlled inverter IVC and the digital analogue converter DAC.

The differential pair of transistors, for example bipolar transistors, referenced PDT, is a differential pair of conventional structure.

It comprises, as illustrated in FIG. 6, two transistors T1 and T2, whose respective emitters are mutually connected to ground by way of a bias current source SC.

The bases of the two transistors form the inputs VIN1 and VIN2 of the differential pair.

The collectors of the two transistors form the outputs VSN1 and VSN2 of the differential pair.

Each collector is moreover linked to the supply voltage Vdd by way of a resistor R.

As indicated especially in FIG. 7, the processing 22 of the signal performed downstream of the phase accumulator therefore comprises here a controlled inversion 224 the effect of which is to transform the phase ramps into a digital triangular signal. This digital triangular signal is converted into an analogue triangular signal by a digital/analogue conversion 225 before being delivered to the differential pair PDT.

Also, the transfer function of the differential pair PDT makes it possible to transform the analogue triangular signal into a waveform comprising exponential portions, and which is closer to the Gaussian than the sinusoid. Therefore, in addition to the reduction in consumption and in integration area, resulting from the omission of the memory of the phase/amplitude converter, the use of a differential pair of transistors makes it possible to obtain a waveform whose envelope more nearly approaches the envelope of an ideal UWB pulse.

By way of indication, it will be possible for example to use the DDS device architecture described in the article by Stéphane Thuries et al., entitled A 6-GHz Low-Power BiCMOS SiGe:C 0.25 μm Direct Digital Synthesizer, IEEE Microwave and Wireless Components Letters, vol. 18, No. 1, January 2008.

In a manner analogous to what was explained above, the signal SG delivered at the output of the DDS device provides, during continuous operation of the phase accumulator, a train of pulses. One of these pulses IMP is illustrated in FIG. 8. It is seen once again that it is possible to isolate such a pulse by operating the phase accumulator ACCP between two phases corresponding to the two crossings A, B of the envelope of the signal generated through or in the vicinity of the zones of zero amplitude ZA and ZB of the envelope of the signal.

Figure 9:
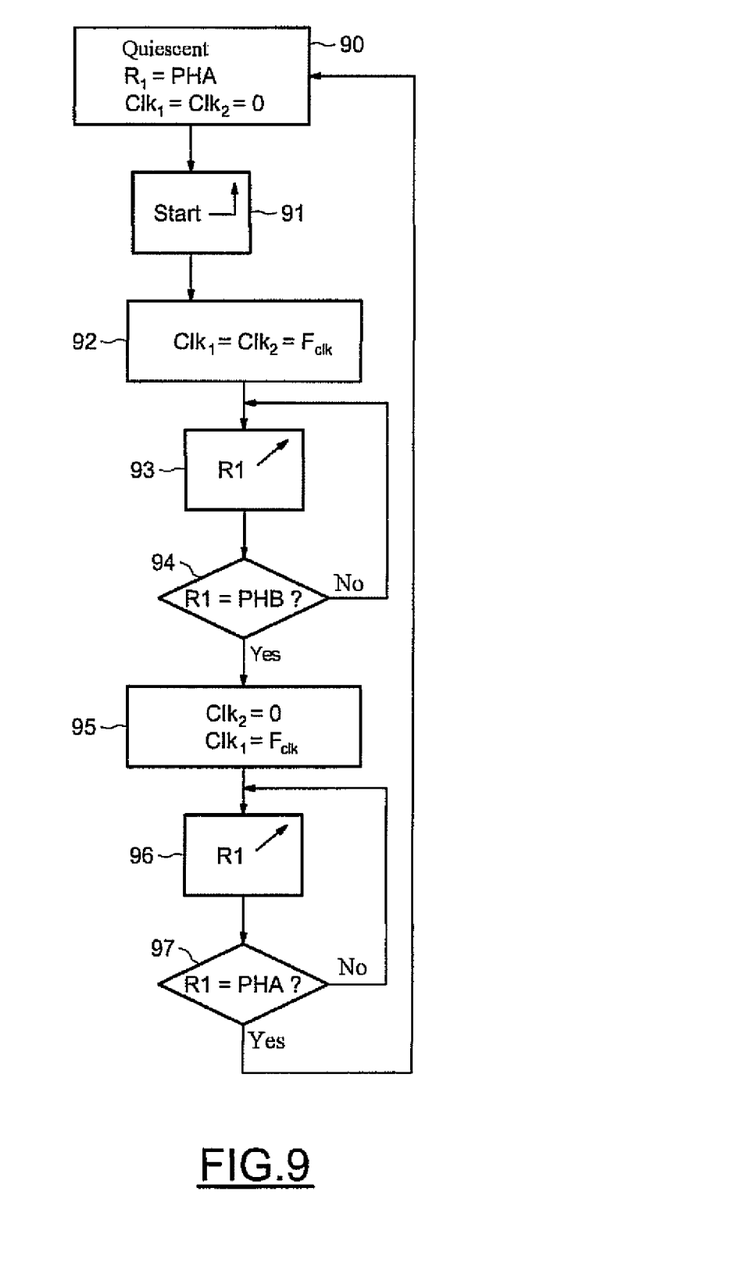
FIG. 9 illustrates a mode of control of a system for generating a pulse signal of the UWB type according to the invention.

An exemplary embodiment and manner of operation of the control means MC of the system is illustrated in FIG. 5 and in FIG. 9.

These control means, which may readily be embodied in the form of logic circuits on the basis of logic synthesis tools, or else in a software manner within a processor, comprise an input for receiving the first frequency or input frequency $F_{clk}$. They also comprise another input for receiving a starting "start" pulse.

The control means MC also receive two phase values PHA and PHB corresponding respectively to the limits A and B of the useful sequence making it possible to isolate a pulse in the output signal SG.

The control means also receive the value R1 of the register of the phase accumulator ACCP and deliver the two clock signals $Clk_1$ and $Clk_2$, respectively to the register of the phase accumulator ACCP and to the register RG connected downstream of the controlled inverter.

As illustrated in FIG. 9, when the phase accumulator is quiescent, the register R1 has the value PHA and the clock signals $Clk_1$ and $Clk_2$ are inactive (zero value).

During a pulse on the "start" input (step 91), the signals $Clk_1$ and $Clk_2$ have the same phase and both take the frequency $F_{clk}$. Stated otherwise the two signals are then identical.

The value R1 of the register of the phase accumulator ACCP is then incremented with the phase increment Δp at the tempo of the frequency $F_{clk}$ (step 93).

This continues as long as the value R1 has not attained the value PHB.

When this is the case (step 94), the clock signal $Clk_2$ is deactivated (step 95), while the clock signal $Clk_1$ continues to be active with the frequency $F_{clk}$.

The effect of this is therefore to deliver a zero signal as output from the DDS device, this having made it possible to deliver between the points A and B a pulse IMP of the ultra wide band type.

The value R1 of the register of the phase accumulator ACCP continues to be incremented (step 96), until it again attains the value PHA (step 97), thereby resetting the register to its quiescent state.

This quiescent state will be preserved until the appearance of a new "start" pulse, and the effect of this will be to trigger and to deliver a new pulse IMP.

It is moreover possible to perform a controlled adjustment of the value of the frequency $F_{clk}$ and/or of that of the phase increment Δp, so as to adjust in a controlled manner the central frequency and/or the bandwidth of each pulse IMP.

In this regard, advantageously it will therefore be possible to provide, as illustrated for example in FIG. 1, control means MCTL which will make it possible to deliver in a controlled manner the values of the frequencies $F_{clk}$ and of that of the increment Δp. These control means can be embodied in logic circuit form or else realized in a software manner.

Of course, these control means MCTL can also be present in the architecture illustrated in FIG. 5.

Likewise, the control means MC which were described with reference to FIG. 5 can be used with the architecture of FIG. 1.

The use of a direct digital frequency synthesis device therefore makes it possible to generate pulses of the ultra wide band type with bandwidths that can be controlled in real time in steps of Δp, and with perfectly controlled central frequencies. All these operations are synchronous and the settling time is equal to a clock period. This makes it possible to obtain a particularly attractive system for micrometer-wave telecommunication systems.

Such a device can be readily embodied in BiCMOS or CMOS technology in an integrated manner.

Also, by way of indication, for 65-nanometer CMOS technology, the estimated consumption of a system SYS is of the order of 1.8 mW for a simple accumulator structure based on 9 bits with a frequency $F_{clk}$ of 1.7 GHz.

The invention is not limited to the embodiments and modes of implementation which have just been described but embraces all variants thereof.

Thus, the structure of the digital synthesis device can take yet other forms. The phase/amplitude converter can for example be a digital algorithm making it possible to calculate the output sample on the basis of the input phase. This converter can even be omitted and its effect integrated into the digital/analogue converter which then becomes non-linear.

Also, whatever structure is used, it will be possible to apply this structure for the generation of pulse signals of the ultra wide band type in the manner just described.

The invention claimed is:

1. A system for generating an ultra wide band (UWB) pulse signal, the system comprising:
    a direct digital synthesis device comprising
        a phase accumulator configured to deliver, at a first frequency, phases coded on i bits mutually spaced apart by a phase increment different from a power of two, greater than $2^i/3$, and less than $2^i/3+2^i/2$, and a processor configured to receive the phases and to deliver an amplitude-modulated output signal with an envelope including a series of regions respectively delimited by zones of zero amplitude, each part of the amplitude-modulated output signal in one of the series of regions forming at least one UWB pulse with a central frequency being equal to the first frequency and a width based upon the phase increment; and a first controller configured to control operation of said direct digital synthesis device.

2. The system according to claim 1 wherein said processor comprises a phase/amplitude converter to be coupled to an output of said phase accumulator and configured to receive samples of a waveform corresponding to the envelope of the amplitude-modulated output signal.

3. The system according to claim 2 wherein the waveform is a portion of a sinusoid.

4. The system according to claim 2 wherein the waveform is a Gaussian.

5. The system according to claim 2 wherein said processor comprises:

a converter configured to generate a triangular analog signal based upon the output of said phase accumulator; and a differential pair of transistors coupled to an output of said converter and configured to generate the at least one UWB pulse.

6. The system according to claim 5 wherein said converter comprises:

an inverter to be coupled to the output of said phase accumulator; and a digital-to-analog converter to be coupled to an output of said inverter.

7. The system according to claim 1 wherein the phase increment is not equal to $2^i/2$.

8. The system according to claim 1 wherein said first controller activates said phase accumulator from a first phase value, the first phase value corresponding to a value of a signal generated at an output of said direct digital synthesis device and situated adjacent a first zone of zero amplitude of the amplitude-modulated output signal, up to a second phase value corresponding to a value of the signal generated at the output of said direct digital synthesis device and situated adjacent a second zone of zero amplitude of the amplitude-modulated output signal, the first zone and the second zone being consecutive.

9. The system according to claim 1 further comprising a second controller configured to adjust at least one of a value of the first frequency and the phase increment, thereby adjusting the central frequency and the width of each UWB pulse.

10. The system according to claim 1 wherein said direct digital synthesis device is based upon a complementary metal-oxide-semiconductor integrated circuit (CMOS IC).

11. A system for generating an ultra wide band (UWB) pulse signal, the system comprising:

a phase accumulator configured to deliver, at a first frequency, phases coded on i bits mutually spaced apart by a phase increment different from a power of two; and a processor configured to receive the phases and to deliver an amplitude-modulated output signal with an envelope including a series of regions respectively delimited by zones of zero amplitude, each part of the amplitude-modulated output signal in one of the series of regions forming at least one UWB pulse with a central frequency being equal to the first frequency and a width based upon the phase increment.

12. The system according to claim 11 wherein said processor comprises a phase/amplitude converter to be coupled to an output of said phase accumulator and configured to receive samples of a waveform corresponding to the envelope of the amplitude-modulated output signal.

13. The system according to claim 12 wherein said processor comprises:

a converter configured to generate a triangular analog signal based upon the output of said phase accumulator; and a differential pair of transistors coupled to an output of said converter and configured to generate the at least one UWB pulse.

14. The system according to claim 13 wherein said converter comprises:

an inverter to be coupled to the output of said phase accumulator; and a digital-to-analog converter stage to be coupled to an output of said inverter.

15. The system according to claim 11 further comprising a controller configured to adjust at least one of a value of the first frequency and the phase increment, thereby adjusting the central frequency and the width of each UWB pulse.

16. A method for generating an ultra wide band (UWB) pulse signal comprising:

delivering, at a first frequency and with a phase accumulator of a direct digital synthesis device, phases coded on i bits mutually spaced apart by a phase increment different from a power of two, greater than $2^i/3$, and less than $2^i/3+2^i/2$; and receiving, with a processor of the direct digital synthesis device, the phases and delivering an amplitude-modulated output signal with an envelope including a series of regions respectively delimited by zones of zero amplitude, each part of the amplitude-modulated output signal in one of the series of regions forming at least one UWB pulse with a central frequency being equal to the first frequency and a width based upon the phase increment.

17. The method according to claim 16 wherein delivering the phases is performed sequentially on command between a pair of phases so as to sequentially generate the at least one UWB pulse, the pair of phases corresponding respectively to two successive zones of zero amplitude.

18. The method according to claim 16 wherein digital samples representative of a waveform having a form of the envelope of the amplitude-modulated output signal are stored in the direct digital synthesis device.

19. The method according to claim 18 wherein the direct digital synthesis device comprises a differential pair of transistors; and wherein during each delivery of the phases by the phase accumulator, a triangular analog signal is delivered to the differential pair of transistors based upon values of the phases delivered.

20. The method according to claim 16 wherein each delivery of the phases is performed based upon a phase increment not being equal to $2^i/2$.

21. The method according to claim 16 further comprising adjusting at least one of a value of the first frequency and the phase increment to control the central frequency and the bandwidth of each UWB pulse.

22. A method for generating an ultra wide band (UWB) pulse signal comprising:

delivering, at a first frequency and with a phase accumulator, phases coded on i bits mutually spaced apart by a phase increment different from a power of two; and receiving, with a processor, the phases and delivering an amplitude-modulated output signal with an envelope including a series of regions respectively delimited by zones of zero amplitude, each part of the amplitude-modulated output signal in one of the series of regions forming at least one UWB pulse with a central frequency being equal to the first frequency and a width based upon the phase increment.

23. The method according to claim 22 wherein delivering the phases is performed sequentially on command between a pair of phases so as to sequentially generate the at least one UWB pulse, the pair of phases corresponding respectively to two successive zones of zero amplitude.

24. The method according to claim 22 wherein digital samples representative of a waveform having a form of the envelope of the amplitude-modulated output signal are stored in the processor.

* * * * *